(12) United States Patent
Newmark

(10) Patent No.: US 6,840,718 B2
(45) Date of Patent: Jan. 11, 2005

(54) THREADED HOLE FINISHING TOOL

(76) Inventor: David P. Newmark, 49 Green Pl., New Rochelle, NY (US) 10801

( * ) Notice: Subject to any disclaimer, the term of this patent is extended or adjusted under 35 U.S.C. 154(b) by 53 days.

(21) Appl. No.: 10/053,260

(22) Filed: Jan. 18, 2002

(65) Prior Publication Data
US 2003/0138302 A1 Jul. 24, 2003

(51) Int. Cl.[7] .............................................. B23B 51/08
(52) U.S. Cl. ......................... 408/119; 408/222; 408/224
(58) Field of Search ................................ 408/117, 118, 408/119, 222, 224, 225, 189; 470/198, 199

(56) References Cited

U.S. PATENT DOCUMENTS

| | | |
|---|---|---|
| 1,041,675 A | 10/1912 | Robinson |
| 1,101,157 A | 6/1914 | Wilberg |
| 1,501,117 A | 7/1924 | Johnson |
| 2,767,412 A | 10/1956 | Berkey |
| 2,797,421 A | 7/1957 | Williams et al. |
| 2,948,000 A * | 8/1960 | Borland ........................ 470/209 |
| 2,949,618 A | 8/1960 | Peyser et al. |
| 3,044,325 A | 7/1962 | Halpern |
| 3,233,260 A | 2/1966 | Halpern |
| 3,234,573 A | 2/1966 | Halpern |
| 3,877,099 A | 4/1975 | Halpern |
| 4,580,933 A * | 4/1986 | Wilkins ........................ 408/118 |

FOREIGN PATENT DOCUMENTS

| | | | |
|---|---|---|---|
| DE | 231307 | * 12/1985 | ................. 408/118 |
| JP | 9610 | *  1/1985 | ................. 408/118 |

* cited by examiner

Primary Examiner—Daniel W. Howell

(57) ABSTRACT

A finishing tool rides upward and downward on the surface of a tap. A spring urges the finishing tool toward an outer end of the tap. The finishing tool is guided along a helical flute on the surface of the tap. Cutting edges on the finishing tool are ground to deburr the perimeter of a hole being tapped either during entry of the tap into the hole or during withdrawal. When the cutting edges provide deburring during withdrawal, the helix angle of the helical flute must be less than a critical helix angle to avoid jamming. When the cutting edges provide deburring during entry of the tap, the critical helix-angle limitation is eliminated.

4 Claims, 5 Drawing Sheets

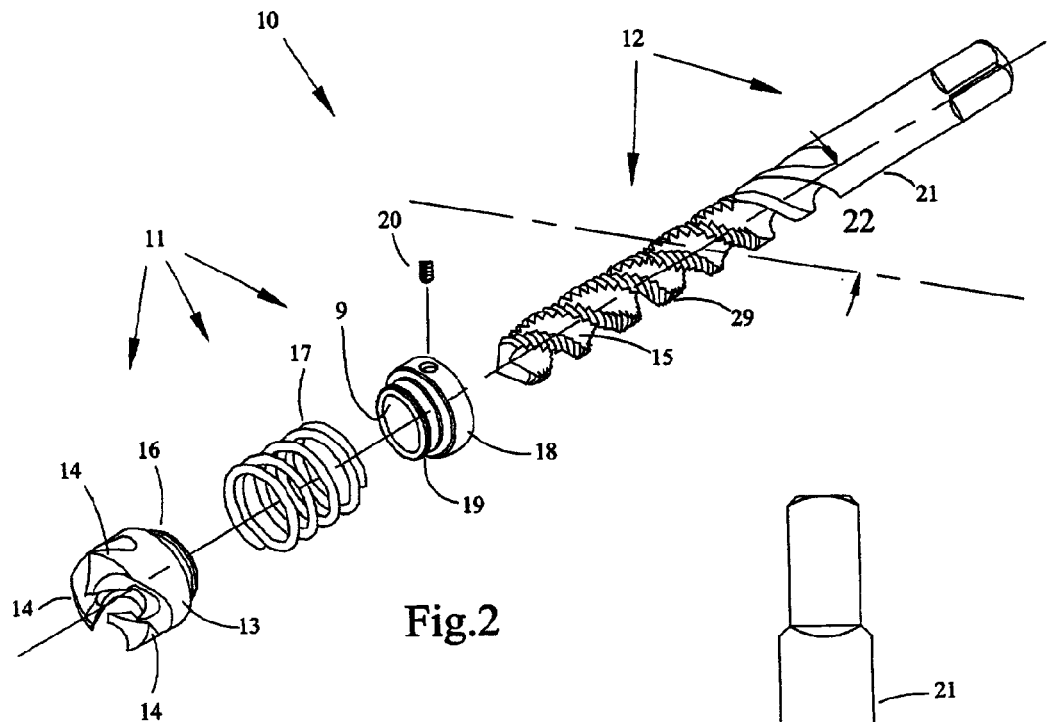
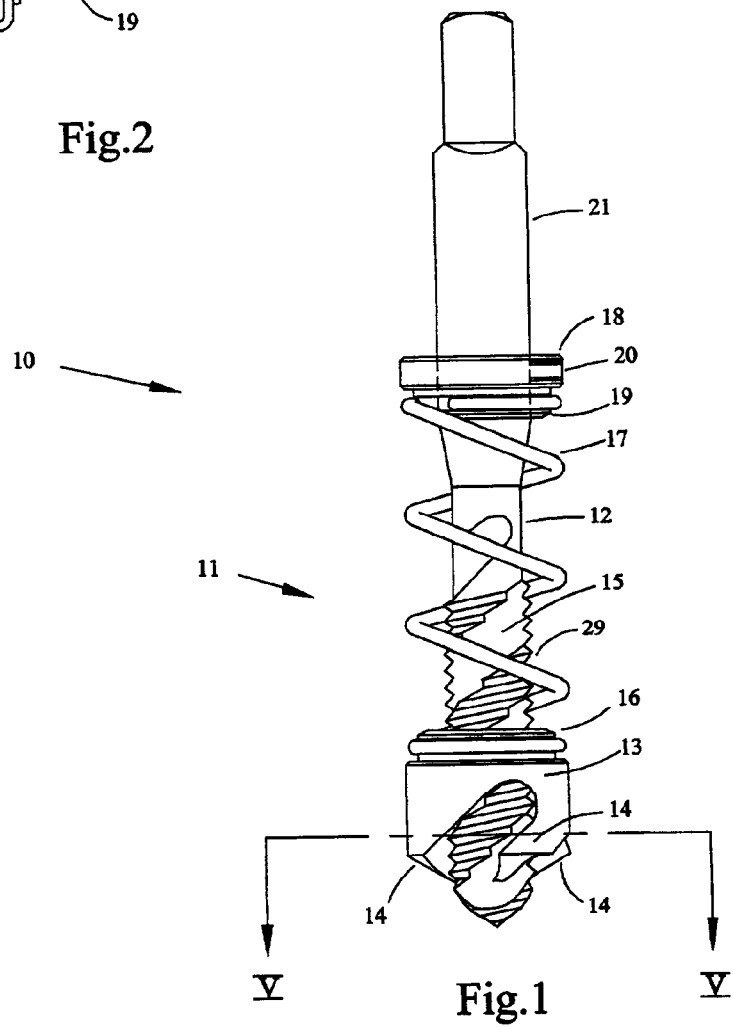
Fig.2
Fig.1

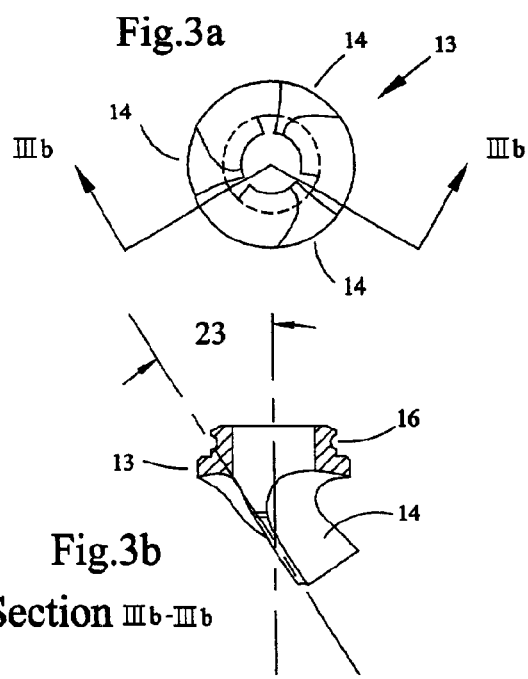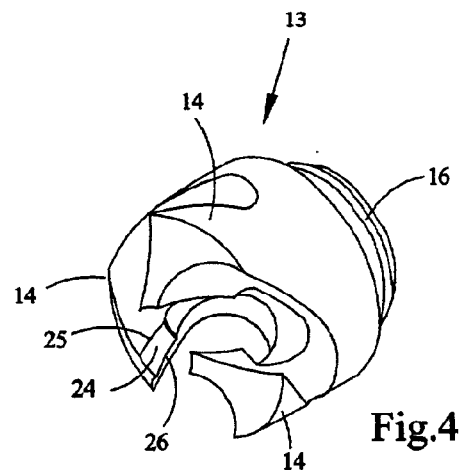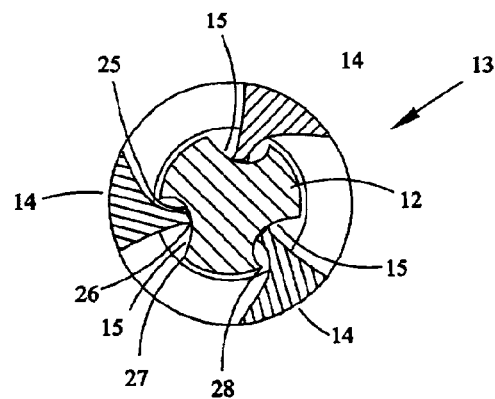

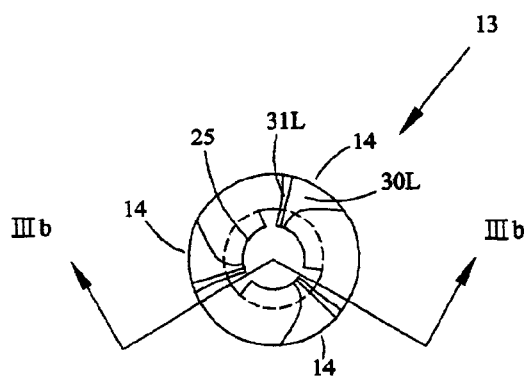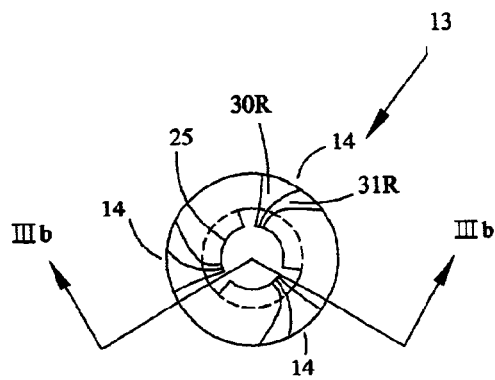
Fig.6a　　　　　　　　　　Fig.7a
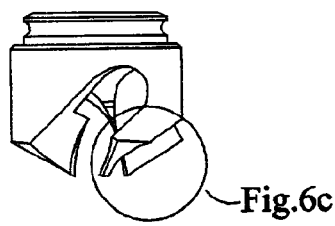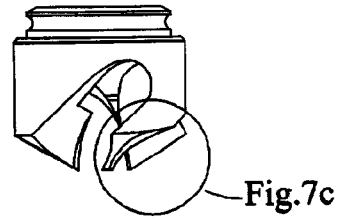
Fig.6b　　　　　　　　　　Fig.7b
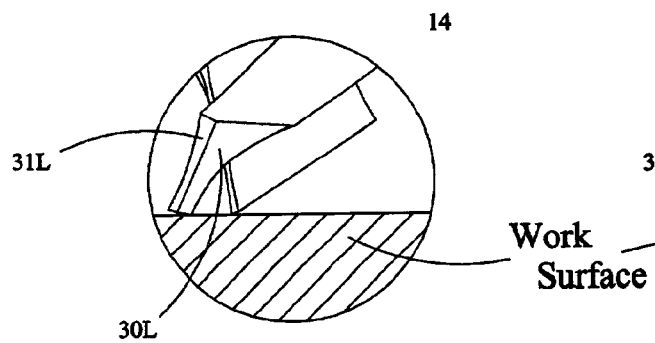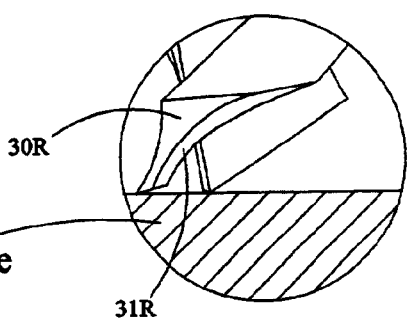
Fig.6c　　　　　　　　　　Fig.7c

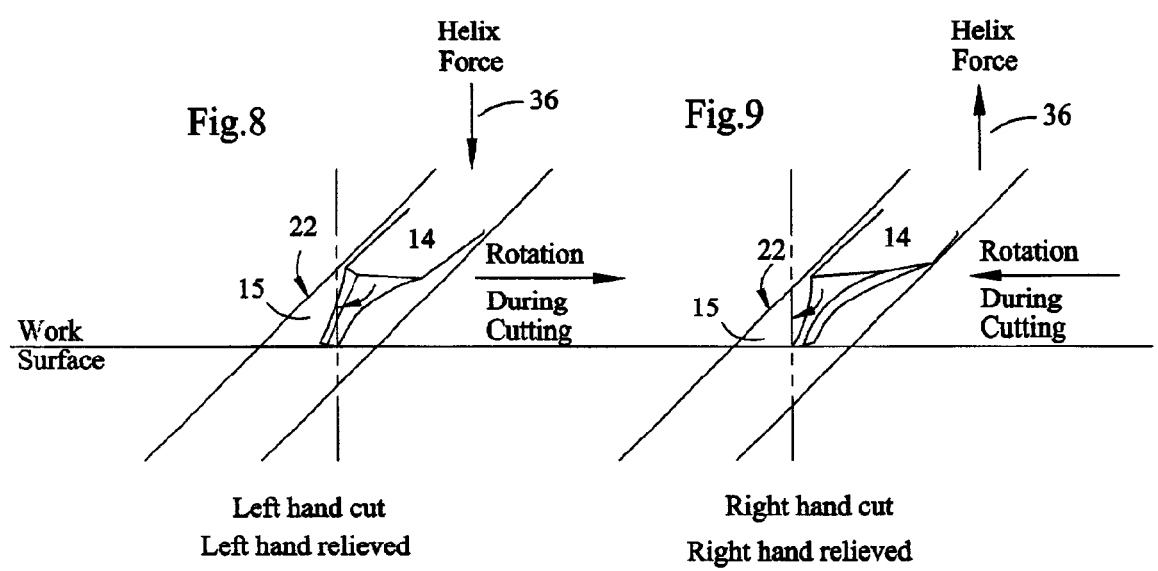

THREADED HOLE FINISHING TOOL

BACKGROUND OF THE INVENTION

The present invention relates to cutting tools, more particularly to tools for countersinking, chamfering and deburring threaded holes.

When holes are threaded by a tap they are often rough at their entrances. Conventionally drill bits and the like are used as hole finishing tools to remove a small amount of material hence finishing the entrance of the hole. This process is known as chamfering or deburring. Drill bits have the disadvantage in that finishing a hole with them requires an additional operation, adding time and cost to complete a finished hole. In addition, drill bits often chatter as the chamfering is done. This chatter creates a roughness of its own at the entrance to the hole.

U.S. Pat. No. 3,233,260 discloses a technique for combining the operations of threading with a tap and deburring into a single operation. This technique has been successful only with straight fluted taps. Modern machining methods tend to use taps with helical flutes. Such taps offer certain benefit when tapping some kinds of materials and when tapping blind holes. The disadvantage has been that the combination hole finishing tools that have been available do not work on helical fluted taps. Deburring tools tend to bind, get stuck, and jam on the tap causing breakage of both cutting tools (the tap and the hole finishing tool) and in many instances when this happens damage to the work piece would also occur, possibly causing it to be scrapped. For this reason much time and effort has been taken to develop this invention to provide a reliable combined hole finishing tool for use on and in conjunction with helical fluted taps.

OBJECTS AND SUMMARY OF THE INVENTION

The present invention provides a hole finishing tool with a unique and different geometry from previous tools suitable for only straight flutes taps. It is capable of combining hole finishing and threading with helical fluted taps.

It is an object of this invention to provide a hole finishing tool that can be used in combination with helical fluted taps.

A particular object of this invention is to provide a means of countersinking, chamfering or deburring a threaded hole during the process of threading with a helical fluted tap.

Another object of this invention is to provide a simple tool that is easy to use, dependable and cost effective for manufacturers who prefer using a helical fluted tap.

Briefly stated, the present invention provides a combined tap and finishing tool in which the finishing tool rides upward and downward on the surface of the tap. A spring urges the finishing tool toward an outer end of the tap. The finishing tool is guided along a helical flute on the surface of the tap. Cutting edges on the finishing tool are ground to deburr the perimeter of a hole being tapped either during entry of the tap into the hole or during withdrawal. When the cutting edges provide deburring during withdrawal, the helix angle of the helical flute must be less than a critical helix angle to avoid jamming. When the cutting edges provide deburring during entry of the tap, the critical helix-angle limitation is eliminated.

According to an embodiment of the invention, there is provided a deburring tool for use in conjunction with a threading tap, comprising: a tap, tapping threads on the tap, helical flutes on the tap overlaid on the tapping threads, a cutting member fitted over a periphery of the tap, means for resiliently urging the cutting member toward an outer end of the tap, means in the cutting member for guiding in the helical flutes to rotate the cutting member as the cutting member is forced up the tap against urging of the means for resiliently urging, at least one cutting edge on the cutting member, and the at least one cutting edge being directed to cut burs from the workpiece during one of withdrawal and advance of the tap in the workpiece.

According to a feature of the invention, there is provided a deburring tool comprising: a tap, at least one helical flute in a surface of the tap, a cutter body fitted on the tap, means for guiding the cutter body along the helical flute, resilient means for urging the cutter body toward an end of the tap, cutting members on the cutter body, and the cutting members being shaped to deburr a perimeter of a hole during one of advance of the tap into the hole and withdrawal of the tap from the hole.

The above and other objects, features and advantages of the present invention will become apparent from the following description read in conjunction with the accompanying drawings, in which like references numerals designate the same elements.

BRIEF DESCRIPTION OF TILE DRAWINGS

FIG. 1 is a side view of a helically fluted tap with a chamfering tool mounted thereon according to an embodiment of the invention.

FIG. 2 is a disassembled perspective view of the tool of FIG. 1.

FIG. 3a is an end view of the cutting body of the invention looking down at the cutting members.

FIG. 3b is a view of a 120° cross section taken along IIIb—IIIb in FIG. 3a, looking at the inside of the cutter body FIG. 3c is a side view of the cutting body and cutting members.

FIG. 4 is a perspective view of the cutting body and cutting members.

FIG. 5 is the cross sectional view taken along V—V in FIG. 1.

FIG. 6a is similar to FIG. 3a but with the cutting members sharpened with a left-hand relief grind. This enables the finishing tool to perform finishing on a standard right-hand cutting tap as it reverses rotation and exits the newly threaded hole.

FIG. 6b is a side view of the cutting body.

FIG. 6c is a close-up view of a helical cutting member with left-hand relief grind taken from the location shown in FIG. 6b.

FIG. 7a, FIG. 7b, FIG. 7c show the cutting body in which the cutting members are sharpened with a right-hand relief grind.

FIG. 8 is a developed cross section of a cutting tool showing helix forces on a tool which performs cutting during withdrawal of the tap.

FIG. 9 is a developed cross section of a cutting tool showing helix forces on a tool which performs cutting during entry of the tap.

DETAILED DESCRIPTION OF THE PREFERRED EMBODIMENT

Figure 1A:
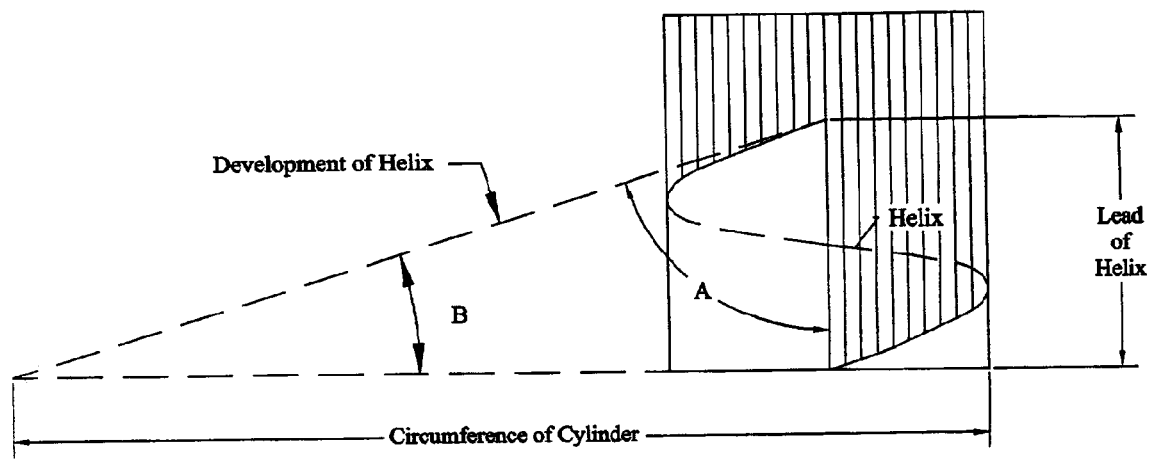
FIG. 1a is a drawing to which reference will be made in defining terms for the description of a helical thread.

Referring to FIGS. 1 and 2, a combined helical fluted tap and finishing tool, shown generally at 10, includes a tap 12 on which is assembled a thread hole finishing device 11. Tap 12 includes at least one helical flute 15.

Referring to FIG. 1a, the definition of "helix angles" is illustrated. A helix is a curve generated by a point moving about a cylindrical surface at a constant rate in the direction of the axis of the cylinder. The lead of a helix is the distance that the helix advances in an axial direction in one complete turn about the cylindrical surface. If a helix is developed (rolled out into a plane), a right triangle is formed in which the circumference of the cylinder forms one side, and the lead of the helix forms a second side, at right angles to the first side. The hypotenuse of the right triangle joins the ends of the other two sides. The helix angle, is illustrated as angle A in the figure. The lead angle B is the measure of inclination of a screw thread. The helix angle A is important to the present invention, as will be described below. In FIG. 1, the helix is a helical flute 15.

Hole finishing device 11 consists of a cutter body 13 fitted to slide up and down on the surface of tap 12. Engagement between guiding elements (not shown) in cutter body 13 and helical flutes 15 rotate cutter body 13 with respect to tap 12 as cutter body 13 rides up and down on tap 12. A plurality of cutting members 14 are located at the lower end of cutter body 13. Cutting members 14 engage, and chamfer, the edge of a tapped hole. The chamfering activity of cutting members 14 may be arranged so that the chamfering takes place during advance of tap 12, or during withdrawal of tap 12, as will be described.

An upper end of cutter body 12 includes a helical spring retaining groove 16. A final turn of spring 17 is snap fitted into spring retaining groove 16. A positioning collar 18, having an axial bore 9 therethrough is fitted over a shank 21 of tap 12. Positioning collar 18 is affixed by a set screw 20 at a position spaced upward from the engagement end of tap 12. A retaining groove 19 in positioning collar 18 is engaged by the final turn at the upper end of spring 17. The spacing of positioning collar 18 from the lower end of tap 17 is such that, when spring 17 uncompressed, the lower end of cutter body is held close to the lower end of tap 17. As is conventional, shank 21 is chucked in a tapping machine, drill press, or the like, to be rotated about its axis, and lowered into contact with a workpiece in which a hole is to be tapped.

In FIG. 2, a helix angle 22 of helical flute 15 corresponds to the helix angle A in FIG. 1a.

Referring now to FIG. 3a, the end view of cutter body 13 shows where a cross section IIIb—IIIb of FIG. 3b is taken. Referring how to FIG. 3b, cutting members 14 exhibit a helix angle 23 that correspond to the helix angle 22 of helical flute 15 on tap 12. The equality or near equality of the helix angles 22 and 23 is necessary to permit free slidability of cutter body 13 as it rides up and down, rotating on tap 12.

Referring now to FIG. 4, an inside surface 24 of each cutting member 14 supports flute following edges 25 and 26. The size of surface 24 and the distance between following edges 25 and 26, plus matching helix angle 23 of cutting member 14 with the helix angle 22 of tap flute 15, is critical to slidable operability of cutting body 13 on tap 12.

Referring now to FIG. 5, the relationship between cutting members 14 and flutes 15 of tap 12 becomes more apparent. Cutting edges 28 at the leading edges of helical flutes 15 perform the tapping as tap 12 rotates in the counterclockwise direction during tapping, as is conventional. Tap 12 rotates in the clockwise direction when being withdrawn from the hole. Non-cutting edges 27 define the second side of helical flutes 15. Flute following edges 25 and 26 ride tightly in flutes 15 to hold the cutting edges 28 and non-cutting edges 27 out of contact with the cutting members 14. In this way, cutting members 14 remain out of contact with threads 29 (FIGS. 1 and 2) of tap 12.

As will be described, cutting members 14 can be ground to perform their cutting action either during entry of tap 12 into the drilled hole, or during withdrawal of tap 12 from the newly tapped hole. Referring now to FIG. 6a, a top end view shows cutting members 14 on cutter body 13. Except for the manner in which cutting members 14 are ground, cutting body 13 remains identical for right-hand and left-hand operation.

Referring to FIGS. 6a, 6b and 6c, cutting members 14 are sharpened with left-hand relief to create a left-hand finishing tool. The cutting edge 30L is shown at the right of cutting member 14 (best seen in FIG. 6c) and the relieved non-cutting edge 31L is shown at the left.

In operation as tap 12 cuts threads into a hole, cutter body 13 is forced along tap by contact with the workpiece against the urging of compression spring 17. During this advance, non-cutting edge 31L rides the top of the hole while spring 17 is compressed. Thus, during advance, cutting members 14 do not chamfer the perimeter of the hole being tapped. After tap 12 has completed threading the hole, its rotation is reversed for removal. During removal, the force built up in spring 17 urges cutter body downward on tap 12, thereby enabling cutting edge 30L to rotate with respect to tap 12 for removing material about the perimeter of the hole, thus finishing it.

I have discovered that the left-hand cutting relief shown in FIG. 6c is suitable only when the helix angle 22 of the flutes 15 on tap 12, as well as helix angle 23 on cutting members 14, must be less than 45 degrees. When helix angles of greater than 45 degrees is used, during reversal of tap 12 for removal from the hole, flutes 15 of tap 12 force cutting edges 30L of cutter body 13 into the work-piece. This jams cutting members 14 between tap flute 15 and the work-piece. The result is breakage of the hole finishing tool.

Referring now to FIGS. 7a, 7b and 7c, a cutter body is shown in which cutting members 14 are ground to form a right-hand cutter. These drawings are the same as corresponding ones of FIGS. 6a–6c except that cutting edge 30R is located on left of cutting members 14, and non-cutting edge 31R is located on the right of cutting members 14. This enables cutting members 14 to be effective for chamfering the hole during insertion of the tap 12 in the hole, and to merely ride on the surface of the workpiece during withdrawal.

I have discovered that grinding the cutting members 14 in the manner shown in FIGS. 7a–7c eliminates the problem of tool jamming when helix angles 22 and 23 are greater than 45 degrees. Thus, when helix angles 22 and 23 are forty-five degrees or greater, right-hand relief grinding of cutting members 14 is required to prevent jamming of the finishing tool as the rotation of tap 12 is reversed for removal from the tapped hole.

Right-hand relief sharpening solves the problem of the finishing tool jamming and failing when the helix angles 22 and 23 are 45 degrees or greater. It is to be noted that right-hand relieved tools also work with helix angles of less than 45 degrees. I believe that right-hand relief sharpening permits use with helix angles from about zero to about 60 degrees.

In contrast, left-hand relieved tools are operable only with helix angles from about zero and about 44 degrees.

The foregoing description is based on an embodiment of the invention in which tap 12 cuts right-hand threads. For a left-hand thread cutting tap 12 the cutting angles and limits on helix angles must be reversed.

Referring to FIGS. 8 and 9, the difference in the allowed value of helix angle 22/23 is created by the direction of the force on cutting members 14 during deburring. In FIG. 8, deburring takes place as helix 15 rotates to the right during withdrawal of tap 12. This produces a downward force 36 on cutting members 14 which adds to the resilient force of the spring. As helix angle 22 increases, downward force 36 also increases. In tests, at a helix angle 22 of about 45 degrees, the sum of the downward forces of the spring and the helix-derived force 36 is sufficient to cause cutting members 14 to dig into the workpiece, thereby locking cutting members 14, and destroying the tool. That is, at a critical helix angle 22 of about 45 degrees, the tool locks and is destroyed. The critical angle is somewhat variable depending on the strength of spring 17, and on the depth to which tap 12 enters the hole. That is, if a stronger spring 17 (one having a greater force constant) creates a greater total downward force than a weaker spring 17. Thus, the critical helix angle is smaller than with a weaker spring 17. Also, since spring force increases with the distance it is compressed, when tapping a deep hole, or when tap 12 is allowed to pass deeply through a hole, the spring force contribution is greater than when tap 12 enters shallowly into the hole. Consequently, the critical helix angle is smaller for deep penetrations than for shallow penetrations.

Referring now to FIG. 9, in contrast, a helix force 38, generated during entry of tap 12 into a hole in the workpiece is directed upward. This reduces the total force acting on cutting members 14. As the helix angle 22 increases, the upward helix force 38 also increases. If necessary, the strength of spring 17 can be adjusted to compensate for the difference in total downward force on cutting members 14. Thus, a critical helix angle does not exist in this case. The helix angle is limited by physical factors rather than by critical helix angle. From a practical standpoint, a helix angle of about 60 degrees is about the maximum that can be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A threaded hole finishing tool comprised of:

a deburring tool for use in conjunction with a threading tap having spiral or helical flutes, said tap flutes each having a circumferentially rearward cutting edge and a circumferentially forward non-cutting edge, and said deburring tool being comprised of a cutter body having cutting members of a spiral or helical nature conforming to the spiral or helical nature of the flutes in said threading tap, said cutting members having following edges that are separated by inside surfaces which contact the flutes of the tap and allow the cutter body to axially move up and down along the tap's flutes and simultaneously rotate with the helical nature of the tap's flutes while not engaging the tap's cutting edges (28) and non-cutting edges (27), and while being resiliently held to said tap by means of a spring which urges said cutter body towards the cutting end of said tap.

2. A deburring tool as described in claim 1, wherein the cutting members of said deburring tool and the spiral flutes of said threading tap have a helix angle greater than 45 degrees and less than 60 degrees and where the cutting edge (30R) of the deburring tool is ground to cut in the same direction as the tap's cutting direction.

3. A deburring tool as described in claim 1, wherein the cutting members of said deburring tool and the spiral flutes of said threading tap have a helix angle less than 45 degrees and mare than 5 degrees and where the deburring tool rides the top surface of the hole as it is being threaded and when the rotational direction of the tap is reversed the deburring tool's cutting members, which are ground to cut in the opposite direction as that of the tap, remove material from the top of the hole.

4. A deburring tool as described in claim 1, wherein the cutting members of said deburring tool and the spiral flutes of said threading tap have a helix angle less than 45 degrees and more than 5 degrees and the deburring tool is ground to cut in the same direction as the tap's cutting direction.

* * * * *